(12) United States Patent
Himmelstoss

(10) Patent No.: US 10,128,567 B2
(45) Date of Patent: Nov. 13, 2018

(54) ANTENNA DEVICE FOR A VEHICLE

(71) Applicant: Robert Bosch GmbH, Stuttgart (DE)

(72) Inventor: Armin Himmelstoss, Weissach Im Tal (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 15/307,484

(22) PCT Filed: Mar. 3, 2015

(86) PCT No.: PCT/EP2015/054414
§ 371 (c)(1),
(2) Date: Oct. 28, 2016

(87) PCT Pub. No.: WO2015/169469
PCT Pub. Date: Nov. 12, 2015

(65) Prior Publication Data
US 2017/0047649 A1    Feb. 16, 2017

(30) Foreign Application Priority Data

May 6, 2014 (DE) .......................... 10 2014 083 389

(51) Int. Cl.
*H01Q 1/32* (2006.01)
*H01Q 13/06* (2006.01)
(Continued)

(52) U.S. Cl.
CPC ......... *H01Q 1/3283* (2013.01); *H01Q 1/3233* (2013.01); *H01Q 13/06* (2013.01);
(Continued)

(58) Field of Classification Search
CPC .. H01Q 1/3233; H01Q 1/3283; H01Q 21/064; H01Q 13/06
See application file for complete search history.

(56) References Cited

U.S. PATENT DOCUMENTS

| | | |
|---|---|---|
| 5,657,024 A | 8/1997 | Shingyoji et al. |
| 2007/0139287 A1 | 6/2007 | Inomata et al. |
| 2013/0120205 A1 | 5/2013 | Thomson et al. |

FOREIGN PATENT DOCUMENTS

| | | |
|---|---|---|
| DE | 102012109106 A1 | 3/2014 |
| EP | 0570863 A2 | 11/1993 |

(Continued)

OTHER PUBLICATIONS

International Search Report dated Jun. 1, 2015 in International Application PCT/EP2015/054414, filed Mar. 3, 2015.

*Primary Examiner* — Hoang Nguyen
*Assistant Examiner* — Awat Salih
(74) *Attorney, Agent, or Firm* — Norton Rose Fulbright US LLP; Gerard Messina

(57) ABSTRACT

An antenna device for a vehicle, including a generating device for generating electromagnetic waves, a waveguide system for transmitting electromagnetic waves, the waveguide system including a plurality of waveguide set-ups. The waveguide set-ups each having an inlet for feeding in the generated electromagnetic waves, the waveguide set-ups each including a plurality of outlets connected to the respective inlet, in order to couple out the electromagnetic waves fed into the respective inlet. The plurality of respective outlets being connected to openings in a surface, from which the electromagnetic waves are able to radiate, so that the surface includes a plurality of regions, whose respective openings are connected to a separate inlet via a separate waveguide set-up.

12 Claims, 3 Drawing Sheets

(51) Int. Cl.
*H01Q 21/06* (2006.01)
*H01Q 21/28* (2006.01)
*H01Q 21/30* (2006.01)
*G01S 13/02* (2006.01)
*G01S 13/93* (2006.01)

(52) U.S. Cl.
CPC ........... *H01Q 21/064* (2013.01); *H01Q 21/28* (2013.01); *H01Q 21/30* (2013.01); *G01S 2013/0254* (2013.01); *G01S 2013/0272* (2013.01); *G01S 2013/9389* (2013.01)

(56) References Cited

FOREIGN PATENT DOCUMENTS

| | | |
|---|---|---|
| JP | 2004112700 A | 4/2004 |
| JP | 2004158911 A | 6/2004 |
| JP | 2008005164 A | 1/2008 |
| WO | 2009093779 A1 | 7/2009 |

ANTENNA DEVICE FOR A VEHICLE

FIELD

The present invention relates to an antenna device for a vehicle.

BACKGROUND INFORMATION

Generally, automotive radar systems emit electromagnetic waves from a planar exciter line or plane. A disadvantage of these systems is, in particular, that only a maximum theoretical angle of radiation of 180° is possible out of the plane. However, in practice, a maximum evaluation range of, in each instance, ±50° is generally attainable.

SUMMARY

An object of the present invention may be seen as providing an improved antenna device for a vehicle, which overcomes disadvantages of the related art and allows an angle of radiation of more than 180°.

Advantageous embodiments of the present invention are described herein.

According to one aspect, an antenna device for a vehicle is provided, including:
- a generating device for generating electromagnetic waves;
- a waveguide system for transmitting electromagnetic waves;
- the waveguide system including a plurality of waveguide set-ups;
- the waveguide set-ups each having an inlet for feeding in the generated electromagnetic waves;
- the waveguide set-ups each including a plurality of outlets connected to the inlet, in order to couple out the electromagnetic waves fed into the respective inlet;
- the plurality of respective outlets being connected to openings in a surface, from which the electromagnetic waves are able to radiate;
- so that the surface includes a plurality of regions, whose respective openings are connected to a separate inlet via a separate waveguide set-up.

According to one aspect, a vehicle including one or more antenna devices is provided.

In particular, a technical advantage of this is, that due to the openings through which the electromagnetic waves radiate, the surface acts as an antenna or forms one. The antenna formed in this manner includes, in particular, an antenna lobe. Now, any number of surface shapes, from which the electromagnetic waves radiate, is possible. Consequently, the limitation of the related art to a planar exciter line may be overcome in an advantageous manner. For antennae are now possible, which have a radiation range of greater than 180°, by simply shaping the surface having its openings in a suitable manner. Since the electromagnetic waves radiate from the openings, the surface may also be referred to as a radiating surface. Thus, this radiating surface may be incorporated into installation spaces of any shape, if a shape of the surface is selected in accordance with the shape of the installation space. Due to the flexible shaping of the radiating surface, which acts as an antenna or forms one, an adaptation to the contour of the installation position may be made. In this case, in particular, a geometrically more precise interface with the first/next plane to be penetrated (penetrated with respect to the electromagnetic waves) (for example: bumper of the vehicle) has an advantageous effect. Consequently, unwanted reflections between the radiating region of the antenna or the surface, and car body components, may be advantageously minimized.

Providing a plurality of waveguide set-ups also produces, in particular, the technical advantage that the surface has a plurality of regions, which may emit electromagnetic waves independently of one another. For each region is assigned a separate inlet. Therefore, each region forms an antenna having its own antenna lobe, or acts as such an antenna. Consequently, a plurality of antennae are advantageously united in one surface. The surface preferably includes a plurality of antennae. Thus, each of these regions may assume a separate function, in order to generate different antenna characteristics. Therefore, in the case of radar waves, corresponding regions may be formed in such a manner, that a short range (for example, 10 cm to 3 meter) is covered. In particular, a long range (for example, greater than 10 m) may be covered by the radar radiation or the radar waves. In the short range, parking spaces may be probed, for example. The long range may be used, in particular, in connection with an automatic speed control device. Such a speed control device is normally referred to in English as ACC, adaptive cruise control.

Thus, a plurality of regions of the surface may assume different functions. Such functions may include, for example, the following functions: short-range radar, medium-range radar, long-range radar, parking assistance, parking space measurement, pedestrian safety and lane-change assistant.

In addition, the distortions of the antenna characteristics may be minimized by direct attachment or mounting to the first/next plane to be penetrated. The shaping of the radiating region/antenna and the antenna design (signal distribution, amplitudes and phase assignment based on the configuration of the radiating surface) also allow distortions of the antenna characteristics to be eliminated.

According to one specific embodiment, the surface is a surface of a part, for example, a housing.

According to one specific embodiment, electromagnetic waves in the THz to GHz range are provided. In particular, a range of 1 GHz to 24 GHz may be provided. That is to say, in particular, that the generating device is designed to generate such electromagnetic waves in the above-mentioned frequency ranges. For example, the electromagnetic waves are radar waves.

A waveguide system or a waveguide set-up in the spirit of the present invention includes, in particular, one or more waveguides that are interconnected. In particular, the waveguides may be constructed analogously to a network of sewers of a sewer system. Thus, the waveguide set-up includes, for example, one or more junctions, from which waveguides branch off. In particular, the waveguide set-up includes one node or a plurality of nodes, in which a plurality of waveguides each unite to form a common waveguide.

For example, the plurality of waveguide set-ups are formed identically or, preferably, differently.

According to one specific embodiment, at least some of the plurality of regions are formed as planes positioned at angles to each other. This produces, in particular, the technical advantage that a radiation range of >180° may be attained. A plane preferably includes only one region. In particular, a plane includes a plurality of regions. The planes are preferably formed identically or, e.g., differently. Thus, a plane may include, for example, a plurality of regions, whereas another plane includes only one region.

In one specific embodiment, the surface has a curvature. In particular, at least one of the regions has a curvature. The curvature may correspond to a spherical shape.

In one further specific embodiment, the generating device is configured to feed electromagnetic waves having, in each instance, different frequencies and/or intensities, into the inlets. This has, in particular, the technical advantage that different antenna lobes may be generated. Consequently, a different function may be produced, depending on the region. These functions may be, for example, one of the above-mentioned functions.

According to another specific embodiment, the waveguide set-ups have, at least in pairs, different transmission and/or coupling-out characteristics for electromagnetic waves.

This has, in particular, the technical effect or advantage, that each of the regions may generate different antenna lobes, so that different functions may be implemented.

The different transmission and/or coupling-out characteristics may be produced, in particular, using different dimensions of the waveguide set-ups. For example, a width and/or a height of the individual waveguides may be selected according to the desired electromagnetic wave to be transmitted.

According to one specific embodiment, at least one of the waveguides, in particular, all of the waveguides, is/are (a) rectangular waveguide(s).

In a further specific embodiment, a detection device for detecting electromagnetic waves is provided, which is connected to the specific inlet of the plurality of waveguide set-ups, so that when electromagnetic waves are fed into the openings connected to the specific inlet and these injected electromagnetic waves are transmitted by the specific waveguide set-up to the inlet, the electromagnetic waves coupled out there may be detected by the detection device.

This provides, in particular, the technical advantage that the antenna device may now also act as a receiver, and not only as a transmitter. Thus, preferably, in the case of a plurality of inlets, and therefore, in the case of a plurality of waveguide set-ups, the detection device is suitably configured to detect the electromagnetic waves respectively coupled out there. This produces, for example, the technical effect or advantage, that it is possible to locate the regions from which the electromagnetic waves come.

Therefore, when electromagnetic waves are coupled into the openings, these form inlets (or act as inlets or function as an inlet) for the electromagnetic waves into the respective waveguide set-up. The inlets of the waveguide set-ups form outlets for the electromagnetic waves fed into or coupled into the openings (the inlets act as outlets or function as outlets); the electromagnetic waves radiating from or coupling out of the outlets. Therefore, bidirectional transport or bidirectional transmission of electromagnetic waves into the waveguide set-ups is possible.

Each of the regions acts as a separate sensor or forms one. Thus, in the case of radar waves, each of the regions forms a radar sensor or acts as one. Consequently, the regions may generally be referred to as sensors, for example, as radar sensors (in the case of use and/or detection of radar waves).

According to another specific embodiment, the openings are arranged in the form of columns and/or rows. That is to say, in particular, that the openings are therefore arranged in columns and rows in a manner analogous to a table or a matrix, or in just one column, or in just one row. This has, for example, the technical advantage that the openings in the surface are simple to produce. The even spacing allows a simple calculation of the antenna lobe. Conversely, in the case of a desired antenna lobe, this may actually be implemented, using a suitable arrangement of columns and/or rows.

According to a further specific embodiment, the surface is part of an outer housing surface of a housing containing the generating device. This provides the technical advantage that the housing may protect the generating device. The housing advantageously has a dual function: protection and radiation.

According to one specific embodiment, the detection device is also contained in the housing. The advantages apply analogously.

According to one specific embodiment, the waveguide set-ups are formed so as to run in a wall of the housing. In this manner, for example, the technical advantage of the waveguide set-ups being protected in the wall is provided. In addition, a space-saving installation is provided.

According to another specific embodiment, the specific inlet is formed on an inner surface of the wall, the inner surface facing the generating device. This provides, for example, the technical advantage that the generating device and the respective inlet are situated close together, which may allow simple coupling.

One specific embodiment provides a circuit card (also called a circuit board), on which the generating device and/or the detection device are situated. This provides, for example, the technical advantage that the generating device and the detection device may be electrically contacted in a simple manner.

According to one specific embodiment, the generating device simultaneously takes the form of a detection device, and vice versa. That is to say that, in particular, a detection/generating device is therefore provided, which performs both functions: generating electromagnetic waves and receiving or detecting electromagnetic waves. Such a device may be referred to, for example, as a transceiver. In the case of radar waves, such a device may be referred to, for example, as a radar transceiver.

In one specific embodiment, the antenna device is built into or mounted in the vehicle in such a manner, that at least one of the regions faces the roadway, that is, in particular, glances or looks in the direction of the roadway. Thus, the electromagnetic waves emitted from this region are reflected by the roadway, which means that the reflected electromagnetic waves may be detected. Since the roadway is always present as a test object to be detected, misalignment and/or blindness detection may be carried out in an advantageous manner, as explained further below in more detail in connection with the exemplary embodiment of the figures. In general, the explanations there are also valid away from the exemplary embodiment described there.

The present invention is explained below on the basis of preferred exemplary embodiments.

DETAILED DESCRIPTION OF EXAMPLE EMBODIMENTS

Figure 1:
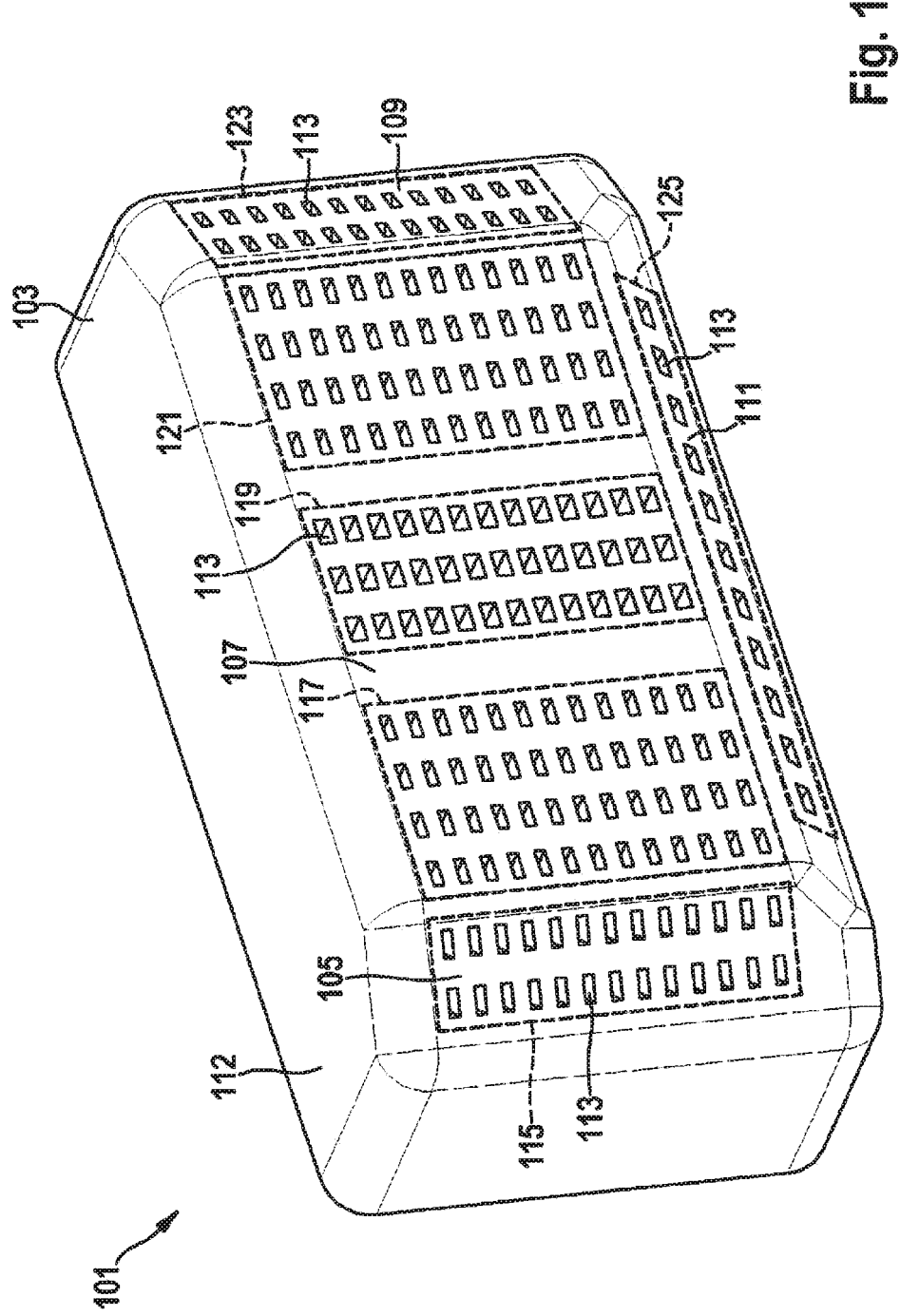
FIG. 1 shows a housing of an antenna device.

In the following, identical reference numerals may be used for the same features.

FIG. 1 shows an antenna device 101 for a vehicle (not shown). Antenna device 101 includes a housing 103 as a component part, which takes the form of a polyhedron of nine surfaces. Different housing shapes are provided in other specific embodiments not shown. Therefore, the polyhedron shape having nine surfaces is only for purposes of illustration and non-limiting. Some of the surfaces of housing 103 are denoted by reference numerals 105, 107, 109 and 111. These surfaces are sections of an outer housing surface 112 of housing 103. Surfaces 105, 107, 109 and 111 are at angles to one another, every surface being planar. Each of surfaces 105, 107, 109, 111 has a plurality of openings 113. Openings 113 of surfaces 105, 107 and 109 are formed or positioned, in each instance, in columns and rows. Openings 113 of surface 111 are only positioned in rows. Therefore, these openings form a row.

Reference numeral 115 denotes a region, which includes openings 113 of surface 105. In a manner analogous to reference numeral 115, reference numerals 117, 119 and 121 denote three respective regions of surface 107, which each include a plurality of openings 113. In a manner analogous to reference numeral 115, reference numeral 123 denotes a region, which includes openings 113 of surface 109. Reference numeral 125 analogously denotes a region, which includes openings 113 of surface 111.

Figure 2:
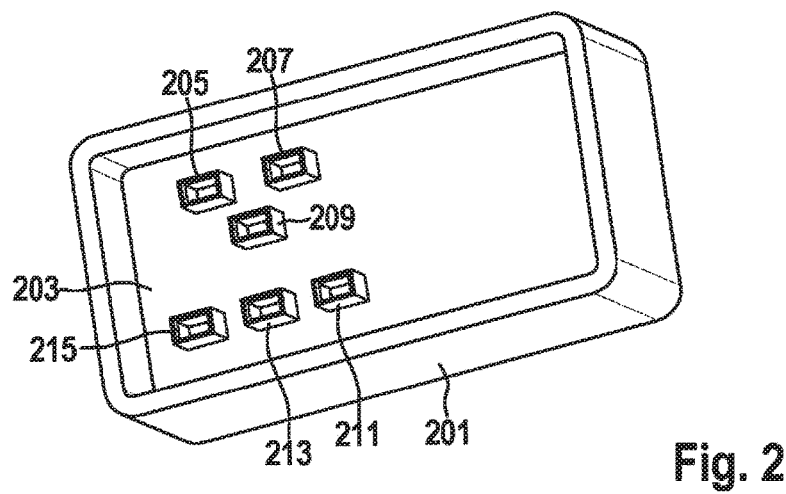
FIG. 2 an oblique plan view of an inner surface of a wall of the housing of FIG. 1.

FIG. 2 shows a wall 201 including an inner surface 203 of housing 103, the outer housing surface corresponding to inner surface 203 being surface 107. A plurality of inlets 205, 207, 209, 211, 213 and 215, which are each inlets of a separate waveguide set-up, are formed on wall 203. The waveguide set-ups themselves are not shown, since they are integrated in or built into wall 201. That is to say, the waveguide set-ups run in wall 201. Thus, inlets 205, 207, 209, 211, 213 and 215 are in communication with openings 113 via the waveguides. When electromagnetic waves, in particular, radar waves, are coupled into inlets 205, 207, 209, 211, 213 and 215, the coupled-in, electromagnetic waves are transmitted to openings 113 and are radiated out from these, away from housing 103.

Therefore, the waveguide set-ups not shown here form a waveguide system for transmitting electromagnetic waves.

In this connection, inlet 205 is in communication with openings 113 of region 121. Inlet 207 is in communication with openings 113 of region 117. Inlet 209 is in communication with openings 113 of region 119. Inlet 211 is in communication with openings 113 of region 115. Inlet 213 is in communication with openings 113 of region 125. Inlet 215 is in communication with openings 113 of region 123.

Figure 3:
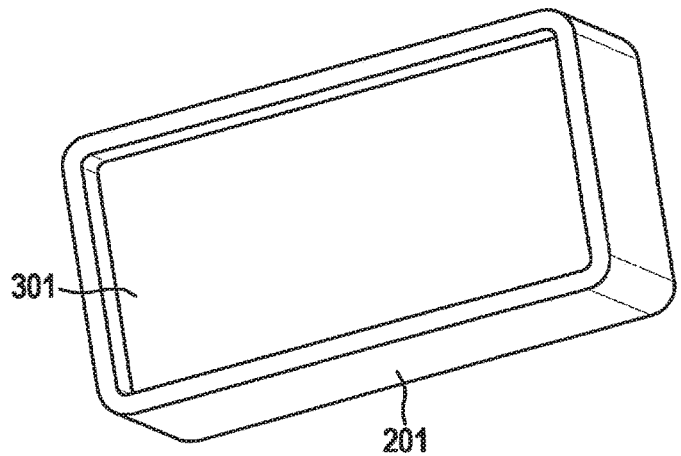
FIG. 3 the inner surface of FIG. 2, including an inserted circuit card.

According to FIG. 3, a circuit card 301 is inserted into housing 103. On its side that faces inner surface 203 of wall 201 and is therefore not visible, circuit card 301 includes a plurality of transceivers, preferably, radar transceivers, which are positioned in accordance with the set-up of inlets 205, 207, 209, 211, 213 and 215. Consequently, a separate transceiver is situated oppositely to each of inlets 205, 207, 209, 211, 213 and 215. Thus, these transceivers form a generating/detection device for electromagnetic waves. Therefore, for example, electromagnetic waves, which are coupled through openings 113 of region 117, may be transmitted by the corresponding waveguide set-up to associated inlet 207, and there, may be detected or received by the corresponding transceiver. The same is valid for other openings 113 and other inlets 207, 209, 211, 213 and 215. Conversely, electromagnetic waves may be fed into inlets 205, 207, 209, 211, 213 and 215, the electromagnetic waves being radiated through openings 113 of the corresponding regions. Thus, each of regions 115, 117, 119, 121, 123 and 125 forms an antenna having a separate antenna lobe.

This is described in further detail, as follows:

Starting from one or more high-frequency sources (the transmitters of the transceivers), electromagnetic waves (signals) are injected into the waveguide system. The waveguide system distributes and transports the signals (electromagnetic waves) with stable amplitude and phase, to a surface radiating through the openings. The amplitude and phase of the individual waveguide branches are preferably calculated exactly according to the desired antenna characteristic or antenna lobe. A plurality of these waveguides radiating through the openings combine to form a predetermined antenna characteristic. The radiating surface (envelope) may assume any shape.

The receiving path functions in the opposite direction according to the same principle.

Separate or simultaneous use of several functions/antennas is possible as a function of the construction of the transmitting and receiving side(s). Each of the regions having openings 113 forms an independent antenna, which is set up for a dedicated function.

The maximum theoretical angle of radiation of 180° of planar antenna systems is overcome, using surfaces of almost arbitrary curvature. As an extreme example, a spherical radiator may be provided in one specific embodiment.

Waveguide structures having openings, which act as a scalable antenna through suitable interconnection, are used as a basis for that.

By positioning at least two or more antenna groups or antenna set-ups (therefore, the regions) in exact locations, a plurality of functions may be implemented in a sensor (front functions: short, medium and long range radar, together with lateral functions: parking assistance, parking space measurement, pedestrian safety and lane change assistant. Functions and function combiners may also be implemented for rear-end/lateral functions.

The flexible shaping of the radiating region/antenna allows adaptation to the contour of the installation position. In this case, in particular, a geometrically closer interface with the first/next plane to be penetrated (for example, bumper) has an advantageous effect. Consequently, unwanted reflections between the radiating region/antenna and car body components may be advantageously minimized. In addition, the distortions of the antenna characteristics may be minimized by direct attachment to the first/next plane to be penetrated. Also, due to the shaping of the radiating region/antenna and the antenna design (signal distribution, amplitude and phase assignment based on the configuration of the radiating surface.

Sensors not having automatic calibration may advantageously be equipped with misalignment detection, using an additional radar beam (or in general, with electromagnetic radiation of any wavelengths). It is explained in greater detail, as follows:

Misalignment:

Relates to unwanted elevation changes of the radiating directions of a surface or of the regions of the surface. For example, due to change of the installation position from light breakdowns of the vehicle or from improper repair work on the vehicle.

One example of a measuring method for detecting misalignment is a propagation-time and/or distance measurement from the radiating surface or from the radiating region of the surface to the roadway surface. A particular distance between the radiating surface or radiating region and the roadway results for a particular installation position; if the installation position changes, then a measured distance to the roadway surface changes. In this manner, functional monitoring may be carried out by comparison to predefined tolerance limits.

This may also be used to set up blindness detection. It is explained in greater detail, as follows:

Blindness Detection:

Similar to misalignment detection by design, but in this case, for example, the level of the signal scattered back by the roadway is evaluated. If no level or only a very low level is received, then this may be interpreted as blindness of the sensor (of the surface or of the region of the surface). Examples of this: slush on the surface or at least on a region. Functionally, this is an important monitoring device, since in the case of blindness, a driver of the vehicle must be informed of a malfunction.

In the described variant or a similar variant, the two above-mentioned functions may also be used for making a self-diagnosis of the sensor.

Using the selected shape of the surface, it may be ensured, for example, that in a particular installation position in a vehicle, a surface having openings always glances or looks in the direction of the roadway or is facing the roadway. In the normal case, the electromagnetic waves, which are therefore radiated in the direction of the roadway, would have to be reflected by it and then be able to be detected again, if the radiating surface were free of slush or similar contamination and/or if the original installation position has not changed. In any case, a signal would have to be able to be acquired, for the roadway is always present as a test object to be detected. If the roadway were not detected, this is an indication that the installation position has changed and/or the surface is dirty. In the specific exemplary embodiment, this test may be performed, for example, using region 125.

Above all, the advantages of the present invention come to fruition in the case of installation at corner positions of a vehicle, since in this instance, from the point of view of the body shell, the theoretical angle of radiation is up to 270°.

Figure 4:
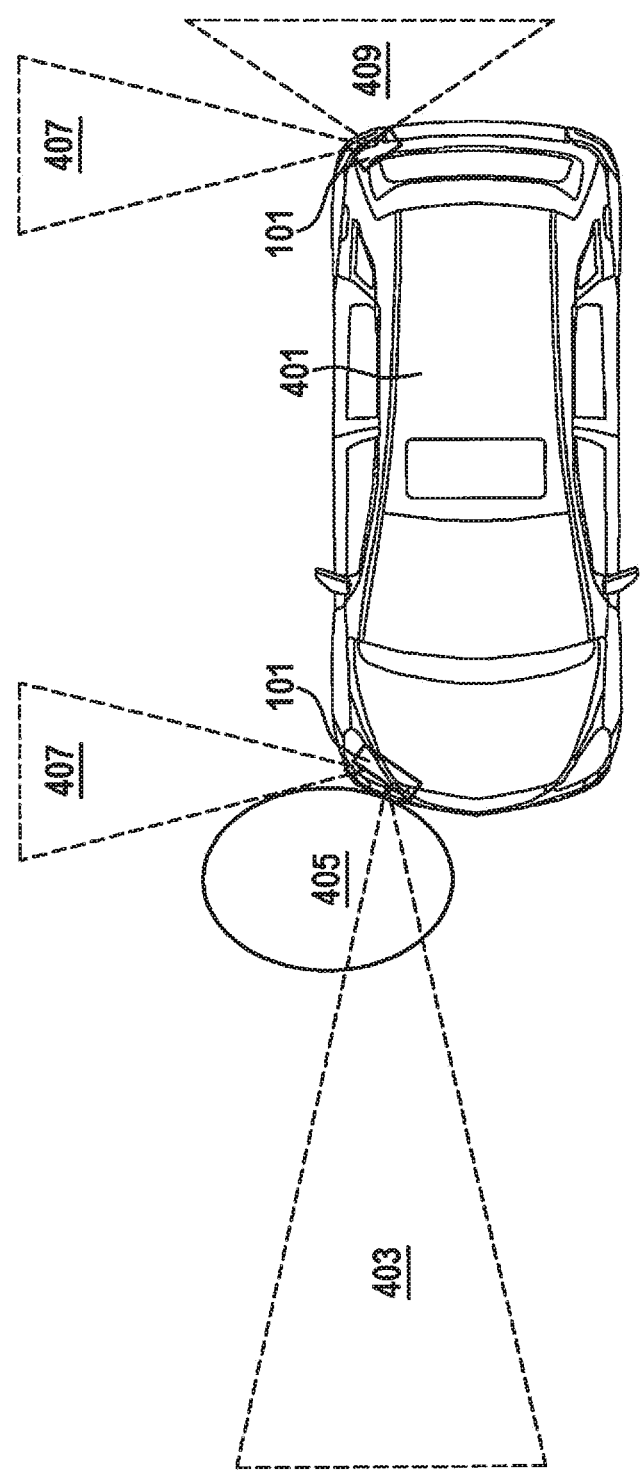
FIG. 4 a vehicle having an antenna device.

FIG. 4 shows a vehicle 401 including a plurality of antenna devices 101, only two antenna devices 101 being explicitly shown in FIG. 4. One of the two antenna devices 101 is situated on the right, in the direction of travel, in the front headlight/bumper region. The other antenna device 101 is situated at the rear, in the direction of travel, in the region of the right tail light. Reference numerals 403, 405, 407 and 409 indicate radiation characteristics or antenna lobes of corresponding antennae (therefore, regions 115, 117, 119, 121, 123 and 125) of antenna device 101, the radiation characteristics or antenna lobes being represented merely schematically. Schematically, because in this case, triangles are drawn in, which, however, cannot correspond to any real antenna lobe. The different triangles should only symbolize, that the individual antenna lobes of regions 115, 117, 119, 121, 123 and 125 are different.

In summary, the present invention therefore includes, in particular, the idea of providing a multiplanar antenna; a plurality of planes positioned at angles to one another being provided, which radiate electromagnetic waves at a separate radiation characteristic, so that different functions may be provided.

What is claimed is:

1. An antenna device for a vehicle, comprising:
   a generating device for generating electromagnetic waves;
   a waveguide system for transmitting electromagnetic waves, the waveguide system including a plurality of antenna groups, wherein each of the plurality of antenna groups includes:
   a single respective inlet opening; and
   a respective plurality of outlet openings that are in a housing surface at a respective region of the housing surface and that are connected to the respective single inlet opening of the respective antenna group so that a respective of the electromagnetic waves is guidable to branch from the respective single inlet opening of the respective antenna group to the respective plurality of outlet openings of the respective antenna group for radiation of the respective electromagnetic wave out of the antenna device from the respective plurality of outlet openings.

2. The antenna device as recited in claim 1, wherein two or more of the regions are planes positioned at non-straight angles relative to each other.

3. The antenna device as recited in claim 1, wherein the generating device is configured for the respective ones of the electromagnetic waves generated by the generating device, that are guided from different ones of the respective single inlet openings of the respective antenna groups, to differ from each other with respect to at least one of frequency and intensity, with different ones of the differing.

4. The antenna device as recited in claim 1, wherein, with respect to each of at least one pair of the plurality of antenna groups, at least one of transmission characteristics and coupling-out characteristics for electromagnetic waves differ between the antenna groups of the respective pair.

5. The antenna device as recited in claim 1, further comprising a detection device for detecting received electromagnetic waves from each of the plurality of antenna groups, wherein, with respect to each of the plurality antenna groups, waves of a respective subset of the received electromagnetic waves enter into the plurality of outlet openings of the respective antenna group, and are fed towards, and combined into a respective combined received signal detected by the detection device, at the respective single inlet opening of the respective antenna group.

6. The antenna device as recited in claim 1, wherein the outlet openings are arranged in at least one of columns and rows.

7. The antenna device as recited in claim 1, wherein the housing surface is an exterior surface of a housing containing the generating device.

8. The antenna device as recited in claim 7, wherein, with respect to each of at least one of the antenna groups, the respective single inlet opening of the respective antenna group and the respective plurality of outlet openings of the respective antenna group are formed at opposite sides of, and connected to each other through, a wall of the housing.

9. The antenna device as recited in claim 7, wherein, with respect to each of at least one of the antenna groups:
   the respective single inlet opening of the respective antenna group and the respective plurality of outlet openings of the respective antenna group are formed at opposite sides of, and connected to each other through, a wall of the housing; and
   the respective single inlet opening is formed on an inner surface of the wall, the inner surface of the wall facing the generating device.

10. The antenna device as recited in claim 1, wherein the housing surface of at least two of the antenna groups is a same planar housing surface, the at least two of the antenna groups being arranged at different respective regions of the same housing surface at a straight angle relative to each other.

11. The antenna device as recited in claim 1, wherein the housing surface of a first of the plurality of antenna groups is a first planar housing surface and the housing surface of a second of the plurality of antenna groups is a second planar housing surface, the first and second planar housing surfaces being arranged relative to each other at a non-straight angle.

12. The antenna device as recited in claim 11, wherein the first planar housing surface is also the housing surface of a third of the plurality of antenna groups, the first and third plurality of antenna groups being arranged at different respective regions of the first planar housing surface at a straight angle relative to each other.

\* \* \* \* \*